United States Patent
Lin et al.

(10) Patent No.: US 10,313,675 B1
(45) Date of Patent: Jun. 4, 2019

(54) ADAPTIVE MULTI-PASS VIDEO ENCODER CONTROL

(71) Applicant: GOOGLE INC., Mountain View, CA (US)

(72) Inventors: Yao-Chung Lin, Sunnyvale, CA (US); Anil Christopher Kokaram, Sunnyvale, CA (US); Andrew Joseph Crawford, San Francisco, CA (US); Hugh Pierre Denman, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 327 days.

(21) Appl. No.: 14/611,084

(22) Filed: Jan. 30, 2015

(51) Int. Cl.
- *H04B 1/66* (2006.01)
- *H04N 19/147* (2014.01)
- *H04N 19/136* (2014.01)

(52) U.S. Cl.
CPC ......... *H04N 19/147* (2014.11); *H04N 19/136* (2014.11)

(58) Field of Classification Search
CPC .. H04N 19/147; H04N 19/176; H04N 19/103; H04N 19/194; H04N 19/40
USPC .................................................... 375/240.14
See application file for complete search history.

(56) References Cited

U.S. PATENT DOCUMENTS

| | | | |
|---|---|---|---|
| 8,406,293 B2 | 3/2013 | Tong et al. | |
| 2005/0015246 A1* | 1/2005 | Thumpudi | G10L 19/24 704/229 |
| 2007/0025441 A1 | 2/2007 | Ugur et al. | |
| 2007/0116126 A1 | 5/2007 | Haskell et al. | |
| 2008/0212677 A1 | 9/2008 | Chen et al. | |
| 2009/0323803 A1 | 12/2009 | Gomila et al. | |
| 2011/0090960 A1* | 4/2011 | Leontaris | H04N 19/103 375/240.12 |
| 2012/0219054 A1 | 8/2012 | Daub et al. | |
| 2013/0094565 A1 | 4/2013 | Yang et al. | |
| 2013/0287099 A1* | 10/2013 | Kwon | H04N 19/00909 375/240.03 |

(Continued)

FOREIGN PATENT DOCUMENTS

| | | |
|---|---|---|
| WO | 2006004605 A3 | 5/2006 |
| WO | 2010144521 A3 | 3/2011 |

OTHER PUBLICATIONS

"Advanced video coding for generic audiovisual services", Telecommunication Standardization Sector of ITU, Recommendation ITU-T H.264, Feb. 2014, 790 pages.

(Continued)

*Primary Examiner* — Frederick D Bailey
*Assistant Examiner* — Masum Billah
(74) *Attorney, Agent, or Firm* — Brake Hughes Bellermann LLP

(57) ABSTRACT

A method includes determining whether a rate distortion cost of a compressed video is above a cost threshold, the compressed video being encoded using a first constant rate factor (CRF). Upon determining the quality of a compressed video is above a cost threshold calculating a second CRF based on the first CRF, and encoding a video associated with the compressed video using the second CRF. Upon determining the quality of a compressed video is below a cost threshold encoding the video using the first CRF and a target bitrate.

15 Claims, 11 Drawing Sheets

(56) References Cited

U.S. PATENT DOCUMENTS

2015/0195525 A1* 7/2015 Sullivan ............... H04N 19/139
375/240.02
2016/0205407 A1* 7/2016 Carmel ............... H04N 19/147
375/240.01

OTHER PUBLICATIONS

Bankoski, et al, "Technical Overview of VP8, An Open Source Video Codec for the Web", 2011 IEEE International Conference on Multimedia and Expo (ICME), Jul. 2011, 6 pages.
Grange, et al, "A VP9 Bitstream Overview", Network Working Group, Internet Draft, Feb. 18, 2013, 14 pages.

* cited by examiner

ADAPTIVE MULTI-PASS VIDEO ENCODER CONTROL

FIELD

Embodiments relate to streaming video.

BACKGROUND

Low latency video transcoding services can be important in video sharing platforms. Low latency can be achieved by splitting a clip into short segments followed by parallel encoding of the segments. Parallel encoding of the segments can introduce quality effects due to transients in encoder rate control.

SUMMARY

Example embodiments describe systems and methods to optimize streaming video.

In a general aspect, a method includes determining whether a rate distortion cost of a compressed video is above a cost threshold, the compressed video being encoded using a first constant rate factor (CRF). Upon determining the quality of a compressed video is above a cost threshold calculating a second CRF based on the first CRF, and encoding a video associated with the compressed video using the second CRF. Upon determining the quality of a compressed video is below a cost threshold encoding the video using the first CRF and a target bitrate.

In another general aspect, a method includes, in a first pass of a multi-pass encoding scheme, encoding a video stream using a first constant rate factor (CFR) to generate a first compressed video stream, determining a rate distortion cost associated with the first compressed video stream and determining whether the rate distortion cost is above a cost threshold. Upon determining the rate distortion cost is above a cost threshold calculating a second CFR based on the first CFR and, in an intermediate pass of the multi-pass encoding scheme, encoding the video stream using the second CFR. Upon determining the rate distortion cost is above a cost threshold, in a final pass of the multi-pass encoding scheme, encoding the video using the first CFR and a target bitrate.

In still another general aspect, a non-transitory computer-readable storage medium having stored thereon computer executable program code which, when executed on a computer system, causes the computer system to perform steps. The steps include determining whether a rate distortion cost of a compressed video is above a cost threshold, the compressed video being encoded using a first constant rate factor (CRF). Upon determining the quality of a compressed video is above a cost threshold calculating a second CRF based on the first CRF, and encoding a video associated with the compressed video using the second CRF. Upon determining the quality of a compressed video is below a cost threshold encoding the video using the first CRF and a target bitrate.

Implementations can include one or more of the following features. For example, the method can further include, after encoding of the video using the second CRF, determining whether a quality associated with encoding the video using the second CRF is above the cost threshold. Upon determining the quality associated with encoding the video using the second CRF is above the cost threshold calculating a third CRF based on the first CRF and the second CRF and encoding the video using the third CRF. Upon determining the quality associated with encoding the video using the second CRF is below the cost threshold encoding the video using the second CRF and the target bitrate. The first CRF can be a default CRF. The rate distortion cost can be a measured bitrate and the cost threshold is a target maximum bitrate. The determining of whether the quality of the compressed video is above the cost threshold can include determining whether a bitrate of the compressed video is ten percent above a target maximum bitrate, and upon determining the bitrate of the compressed video is ten percent above the target maximum bitrate, encoding of the video using the first CRF and the target bitrate includes adjusting the first CRF based on a statistically estimated CRF.

For example, the second CRF can be calculated as:

$$CRF_2 = CRF_1 + \frac{1}{\alpha}\log\left(\frac{B_{max}}{B_1}\right)$$

where $CRF_1$ is the first CRF,
$CRF_2$ is the second CRF,
$\alpha$ is a constant,
Bmax is the target maximum, and
$B_1$ is the bitrate of the compressed video.

For example, the second CRF can be calculated as:

$$CRF_3 = \hat{\alpha}\log(B_{max}) + \hat{\beta}$$

where, $$\hat{\alpha} = \frac{\log(B_1) - \log(B_2)}{CRF_1 - CRF_2},$$

and $$\hat{\beta} = \log(B_1) - \hat{\alpha} CRF_1$$

$CRF_1$ is a CRF used to encode the video in before using the first CRF,
$CRF_2$ is the first CRF,
$\alpha$ is a constant,
Bmax is the target maximum,
$B_1$ is a bitrate associated with $CRF_1$
$B_2$ is the bitrate of the compressed video.

For example, the second CRF can be based on:

$$Cost = D + \lambda B$$

where,
D is a measured distortion between the compressed video and the input video,
$\lambda$ is a weighting of rate/distortion trade-offs, and
B is the bitrate of the compressed video.

For example, the video can be one of a plurality of video segments associated with a video stream. The compressed video can be encoded in a Q-CTRL pass of a multi-pass encoding scheme. The encoding of the video using the first CRF and the target bitrate can include encoding the video in a B-CTRL pass of a multi-pass encoding scheme.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1A:
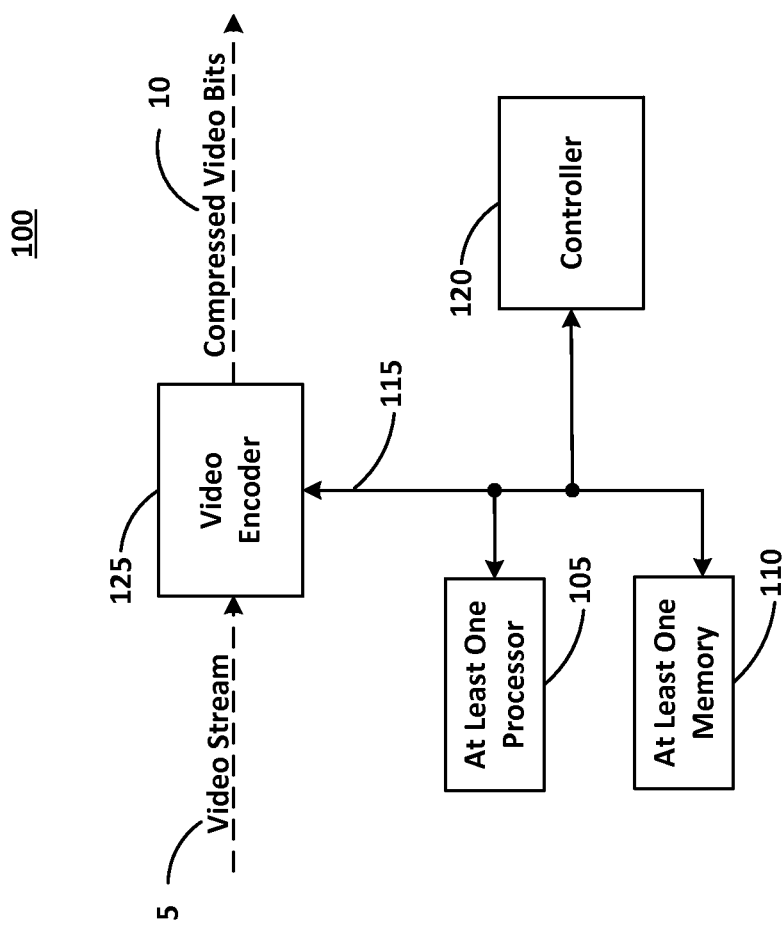
FIG. 1A illustrates a video encoder system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

According to example embodiments, a model configured to predict the behavior of an encoder in each encoding pass of a frame (e.g., in a multi-pass encoding scheme) is described. The model can be used to minimize quality effects due to transients in encoder rate control associated with parallel video transcoding frameworks. In other words, the model can be used to calculate (or determine) parameters or settings used for controlling the encoder during at least one encoding pass in a multi-pass encoding scheme.

In the example of FIG. 1A, a video encoder system 100 may be, or include, at least one computing device and can represent virtually any computing device configured to perform the methods described herein. As such, the video encoder system 100 can include various components which may be utilized to implement the techniques described herein, or different or future versions thereof. By way of example, the video encoder system 100 is illustrated as including at least one processor 105, as well as at least one memory 110 (e.g., a non-transitory computer readable storage medium).

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115.

The at least one processor 105 may be utilized to execute instructions stored on the at least one memory 110, so as to thereby implement the various features and functions described herein, or additional or alternative features and functions. The at least one processor 105 and the at least one memory 110 may be utilized for various other purposes. In particular, the at least one memory 110 can represent an example of various types of memory and related hardware and software which might be used to implement any one of the modules described herein.

The at least one memory 110 may be configured to store data and/or information associated with the video encoder system 100. For example, the at least one memory 110 may be configured to store codecs associated with encoding streaming video. For example, the at least one memory may be configured to store code associated with encoding streaming video. The at least one memory 110 may be a shared resource. As discussed in more detail below, the tile may be a plurality of pixels selected based on a view perspective of a viewer during playback of the viewer. The plurality of pixels may be a block, plurality of blocks or macro-block that can include a portion of the image that can be seen by the user. For example, the video encoder system 100 may be an element of a larger system (e.g., a server, a personal computer, a mobile device, and the like). Therefore, the at least one memory 110 may be configured to store data and/or information associated with other elements (e.g., image/video serving, web browsing or wired/wireless communication) within the larger system.

The controller 120 may be configured to generate various control signals and communicate the control signals to various blocks in video encoder system 100. The controller 120 may be configured to generate the control signals to implement the techniques described below. The controller 120 may be configured to control the video encoder 125 to encode an image, a sequence of images, a video frame, a video sequence, and the like according to example embodiments. For example, the controller 120 may generate control signals corresponding to parameters for encoding video. More details related to the functions and operation of the video encoder 125 and controller 120 (and example variations) will be described below in connection with at least FIGS. 2A, 3, 5A, 5B and 6 and 7.

The video encoder 125 may be configured to receive a video stream input 5 and output compressed (e.g., encoded) video bits 10. The video encoder 125 may convert the video stream input 5 into discrete video frames. The video stream input 5 may also be an image, accordingly, the compressed (e.g., encoded) video bits 10 may also be compressed image bits. The video encoder 125 may further convert each discrete video frame (or image) into a matrix of blocks (hereinafter referred to as blocks). For example, a video frame (or image) may be converted to a 16×16, a 16×8, an 8×8, a 4×4, a 2×2 and/or the like matrix of blocks each having a number of pixels. Although five example matrices are listed, example embodiments are not limited thereto.

The compressed video bits 10 may represent the output of the video encoder system 100. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 105 may be configured to execute computer instructions associated with the controller 120 and/or the video encoder 125. The at least one processor 105 may be a shared resource. For example, the video encoder system 100 may be an element of a larger system (e.g., a mobile device). Therefore, the at least one processor 105 may be configured to execute computer instructions associated with other elements (e.g., image/video serving, web browsing or wired/wireless communication) within the larger system.

Figure 1B:
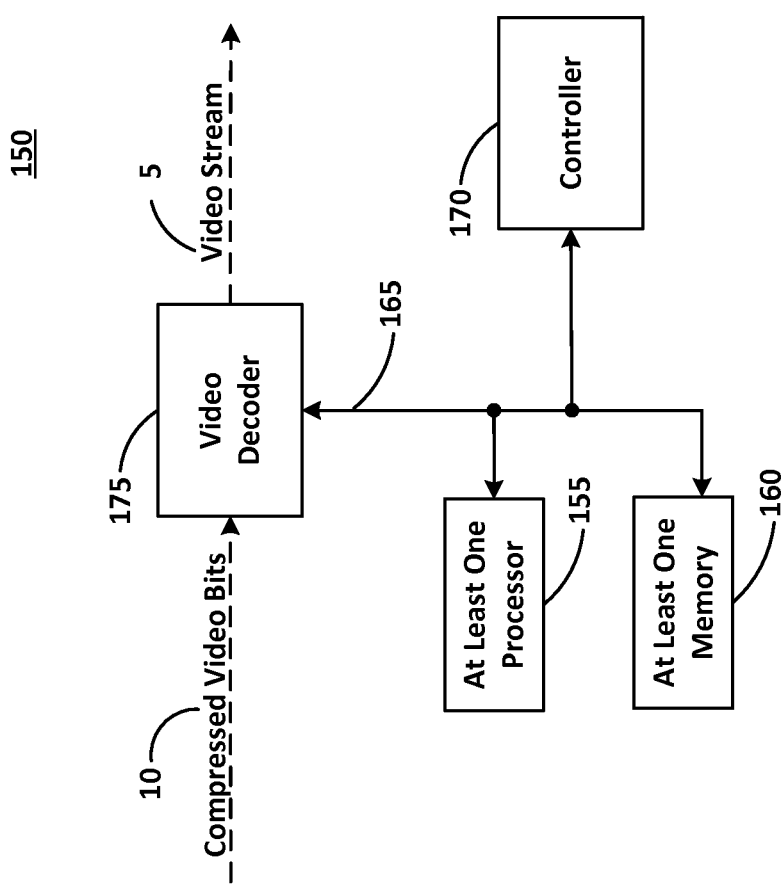
FIG. 1B illustrates a video decoder system according to at least one example embodiment.

In the example of FIG. 1B, a video decoder system 150 may be at least one computing device and can represent virtually any computing device configured to perform the methods described herein. As such, the video decoder system 150 can include various components which may be utilized to implement the techniques described herein, or different or future versions thereof. By way of example, the video decoder system 150 is illustrated as including at least one processor 155, as well as at least one memory 160 (e.g., a computer readable storage medium).

Thus, the at least one processor 155 may be utilized to execute instructions stored on the at least one memory 160, so as to thereby implement the various features and functions described herein, or additional or alternative features and functions. The at least one processor 155 and the at least one memory 160 may be utilized for various other purposes. In particular, the at least one memory 160 can represent an example of various types of memory and related hardware and software which might be used to implement any one of the modules described herein. According to example embodiments, the video encoder system 100 and the video decoder system 150 may be included in a same larger system (e.g., a personal computer, a mobile device and the like). According to example embodiments, video decoder system 150 may be configured to implement the reverse or opposite techniques described with regard to the video encoder system 100.

The at least one memory 160 may be configured to store data and/or information associated with the video decoder system 150. For example, the at least one memory 110 may be configured to store codecs associated with decoding encoded video data. For example, the at least one memory may be configured to store code associated with decoding a streaming video. The at least one memory 160 may be a shared resource. For example, the video decoder system 150 may be an element of a larger system (e.g., a personal computer, a mobile device, and the like). Therefore, the at least one memory 160 may be configured to store data and/or information associated with other elements (e.g., web browsing or wireless communication) within the larger system.

The controller 170 may be configured to generate various control signals and communicate the control signals to various blocks in video decoder system 150. The controller 170 may be configured to generate the control signals in order to implement the video decoding techniques described below. The controller 170 may be configured to control the video decoder 175 to decode a video frame according to example embodiments. The controller 170 may be configured to generate control signals corresponding to decoding video. More details related to the functions and operation of the video decoder 175 and controller 170 will be described below in connection with at least FIGS. 2B and 4.

The video decoder 175 may be configured to receive a compressed (e.g., encoded) video bits 10 input and output a video stream 5. The video decoder 175 may convert discrete video frames of the compressed video bits 10 into the video stream 5. The compressed (e.g., encoded) video bits 10 may also be compressed image bits, accordingly, the video stream 5 may also be an image.

The at least one processor 155 may be configured to execute computer instructions associated with the controller 170 and/or the video decoder 175. The at least one processor 155 may be a shared resource. For example, the video decoder system 150 may be an element of a larger system (e.g., a personal computer, a mobile device, and the like). Therefore, the at least one processor 155 may be configured to execute computer instructions associated with other elements (e.g., web browsing or wireless communication) within the larger system.

Figure 2A:
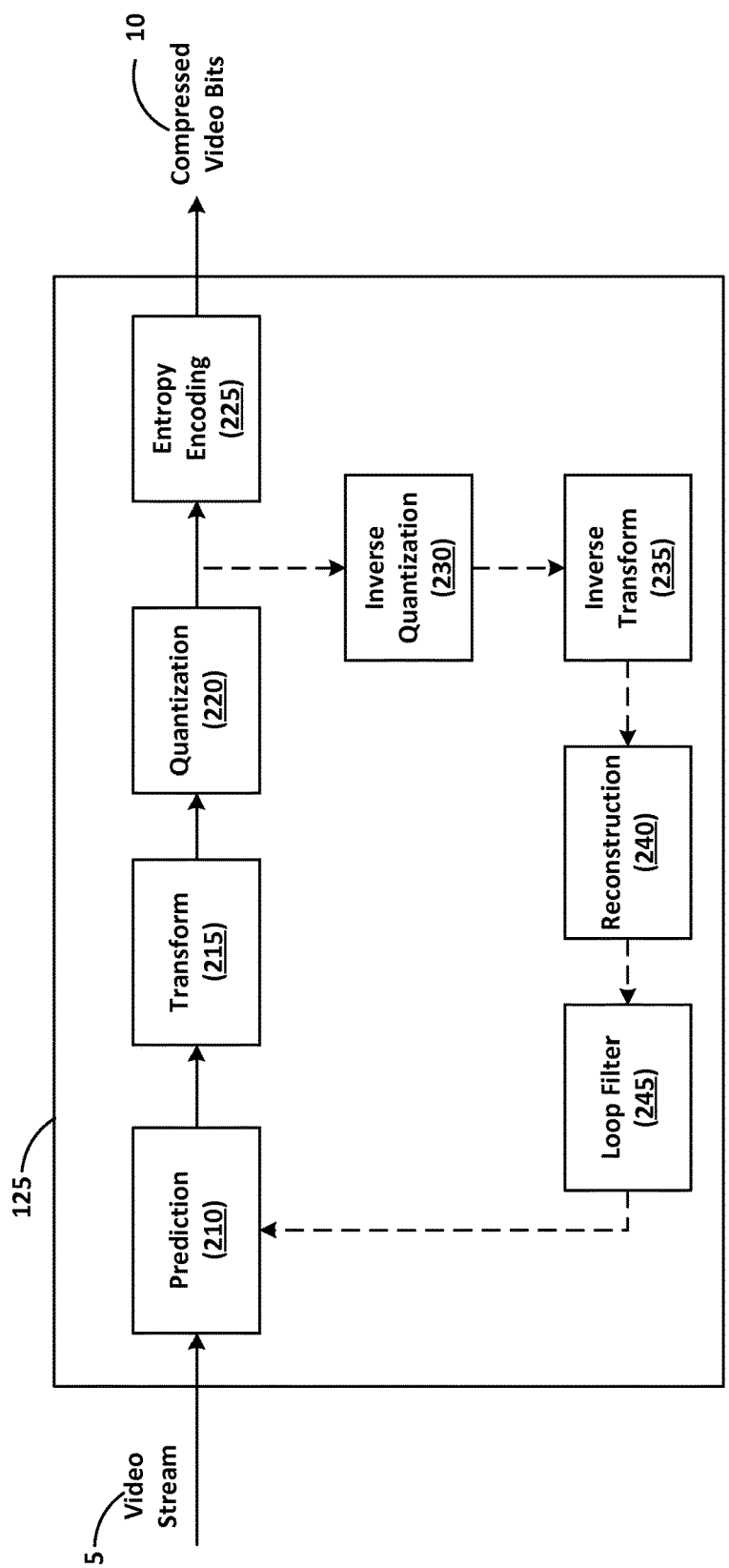
FIG. 2A illustrates a flow diagram for a video encoder system according to at least one example embodiment.
Figure 2B:
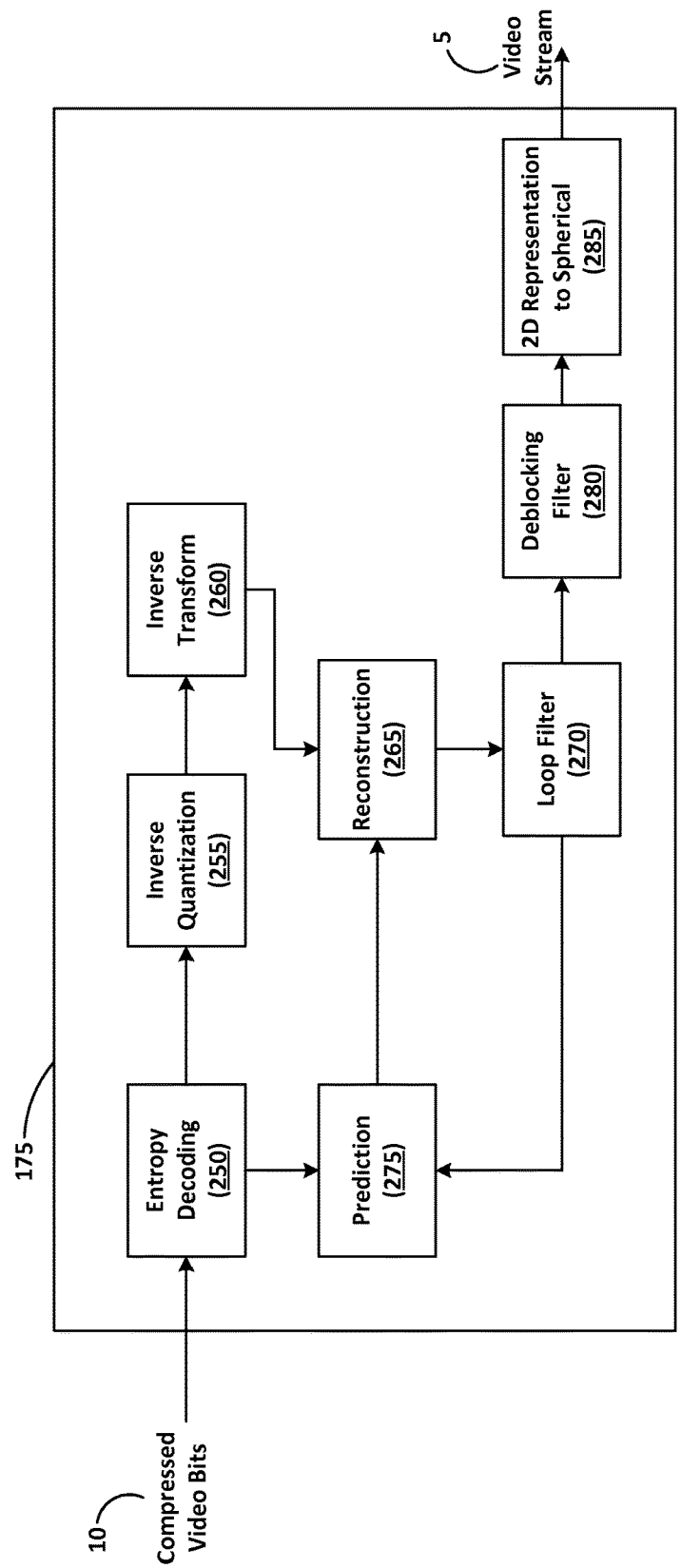
FIG. 2B illustrates a flow diagram for a video decoder system according to at least one example embodiment.

FIGS. 2A and 2B illustrate a flow diagram for the video encoder 125 shown in FIG. 1A and the video decoder 175 shown in FIG. 1B, respectively, according to at least one example embodiment. The video encoder 125 (described above) includes a prediction block 210, a transform block 215, a quantization block 220, an entropy encoding block 225, an inverse quantization block 230, an inverse transform block 235, a reconstruction block 240, and a loop filter block 245. Other structural variations of video encoder 125 can be used to encode input video stream 5. As shown in FIG. 2A, dashed lines represent a reconstruction path amongst the several blocks and solid lines represent a forward path amongst the several blocks.

Each of the aforementioned blocks may be executed as software code stored in a memory (e.g., at least one memory 110) associated with a video encoder system (e.g., as shown in FIG. 1A) and executed by at least one processor (e.g., at least one processor 105) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 215 and/or the quantization block 220.

The prediction block 210 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 225) and entropy coding (e.g., entropy encoding block 225) part of a predictive transform codec. Inter-frame prediction relates to predicting the pixel values in a block of a picture relative to data of a previously coded picture.

The transform block 215 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 215 may be configured to transform the residual (from the prediction block 210) into transform coefficients in, for example, the frequency domain. Typically, transforms include the Karhunen-Loève Transform (KLT), the Discrete Cosine Transform ("DCT"), the Singular Value Decomposition Transform ("SVD") and the asymmetric discrete sine transform (ADST).

The quantization block 220 may be configured to reduce the data in each transformation coefficient. Quantization may involve mapping values within a relatively large range to values in a relatively small range, thus reducing the amount of data needed to represent the quantized transform coefficients. The quantization block 220 may convert the transform coefficients into discrete quantum values, which are referred to as quantized transform coefficients or quantization levels. For example, the quantization block 220 may be configured to add zeros to the data associated with a transformation coefficient. For example, an encoding standard may define 128 quantization levels in a scalar quantization process.

The quantized transform coefficients are then entropy encoded by entropy encoding block 225. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 2A is present to ensure that both the video encoder 125 and the video decoder 175 (described below with regard to FIG. 2B) use the same reference frames to decode compressed video bits 10 (or compressed image bits). The reconstruction path performs functions that are similar to functions that take place during the decoding process that are discussed in more detail below, including inverse quantizing the quantized transform coefficients at the inverse quantization block 230 and inverse transforming the inverse quantized transform coefficients at the inverse transform block 235 in order to produce a derivative residual block (derivative residual). At the reconstruction block 240, the prediction block that was predicted at the prediction block 210 can be added to the derivative residual to create a reconstructed block. A loop filter 245 can then be applied to the reconstructed block to reduce distortion such as blocking artifacts.

The video encoder 125 described above with regard to FIG. 2A includes the blocks shown. However, example embodiments are not limited thereto. Additional blocks may be added based on the different video encoding configurations and/or techniques used. Further, each of the blocks shown in the video encoder 125 described above with regard to FIG. 2A may be optional blocks based on the different video encoding configurations and/or techniques used.

FIG. 2B is a schematic block diagram of a decoder 175 configured to decode compressed video bits 10 (or compressed image bits). Decoder 175, similar to the reconstruction path of the encoder 125 discussed previously, includes an entropy decoding block 250, an inverse quantization block 255, an inverse transform block 260, a reconstruction block 265, a loop filter block 270, a prediction block 275, and a deblocking filter block 280.

The data elements within the compressed video bits 10 can be decoded by entropy decoding block 250 (using, for example, Context Adaptive Binary Arithmetic Decoding) to produce a set of quantized transform coefficients. Inverse quantization block 255 dequantizes the quantized transform coefficients, and inverse transform block 260 inverse transforms (using ADST) the dequantized transform coefficients to produce a derivative residual that can be identical to that created by the reconstruction stage in the encoder 125.

Using header information decoded from the compressed video bits 10, decoder 175 can use prediction block 275 to create the same prediction block as was created in encoder 175. The prediction block can be added to the derivative residual to create a reconstructed block by the reconstruction block 265. The loop filter block 270 can be applied to the reconstructed block to reduce blocking artifacts. Deblocking filter block 280 can be applied to the reconstructed block to reduce blocking distortion, and the result is output as video stream 5.

The video decoder 175 described above with regard to FIG. 2B includes the blocks shown. However, example embodiments are not limited thereto. Additional blocks may be added based on the different video encoding configurations and/or techniques used. Further, each of the blocks shown in the video decoder 175 described above with regard to FIG. 2B may be optional blocks based on the different video encoding configurations and/or techniques used.

Video sharing platforms may provide video streams at a high (or relatively high) video quality while operating at increasingly challenging scale (e.g. on the order of 100 hours of video uploaded per minute). Accordingly, low latency and high throughput transcoding can be important. However, these systems may be required to operate within varying consumer bandwidth environments. Bandwidth adaptation in streaming technology can be implemented using a pre-computation of different versions of a video or video clip at different bitrates. Standards such as Dynamic Adaptive Streaming over HTTP (DASH) and HTTP Live Streaming (HLS) can enable a client video player to switch between the different bitrate versions of the video or video clip to match an available bitrate. The resulting necessity to create multiple transcoded versions of the same clip can increase the importance of high throughput transcoding. A codec-agnostic technique for increasing throughput in proportion to computational resources is to split each input clip into a number of segments which are then encoded in parallel.

For DASH compliant streams, each encoder can operate under a constraint that the bitrate is less than some specified maximum. The parallel encoding process can cause artifacts that manifest as a large discontinuity between the picture quality at the start and at the end of the segment. The viewer observes this as a cycle of picture quality from bad to good at intervals equal to the segment duration. The cycling of picture quality can be exacerbated when segments are short (e.g., on the order of seconds) which can be typical for low latency applications. The cycling of picture quality can be caused by rate control in the encoding process.

In a parallel processing video encoding system a goal is to minimize (or eliminate) the need for information to be communicated between processing nodes so as to deploy the system on general purpose processing computing systems or farms. Accordingly, in example implementations, the rate control process can be controlled at the video segment level and not at the picture or macroblock level. This can enable the same system to be deployed regardless of the specific codec or codec implementation.

Figure 3:
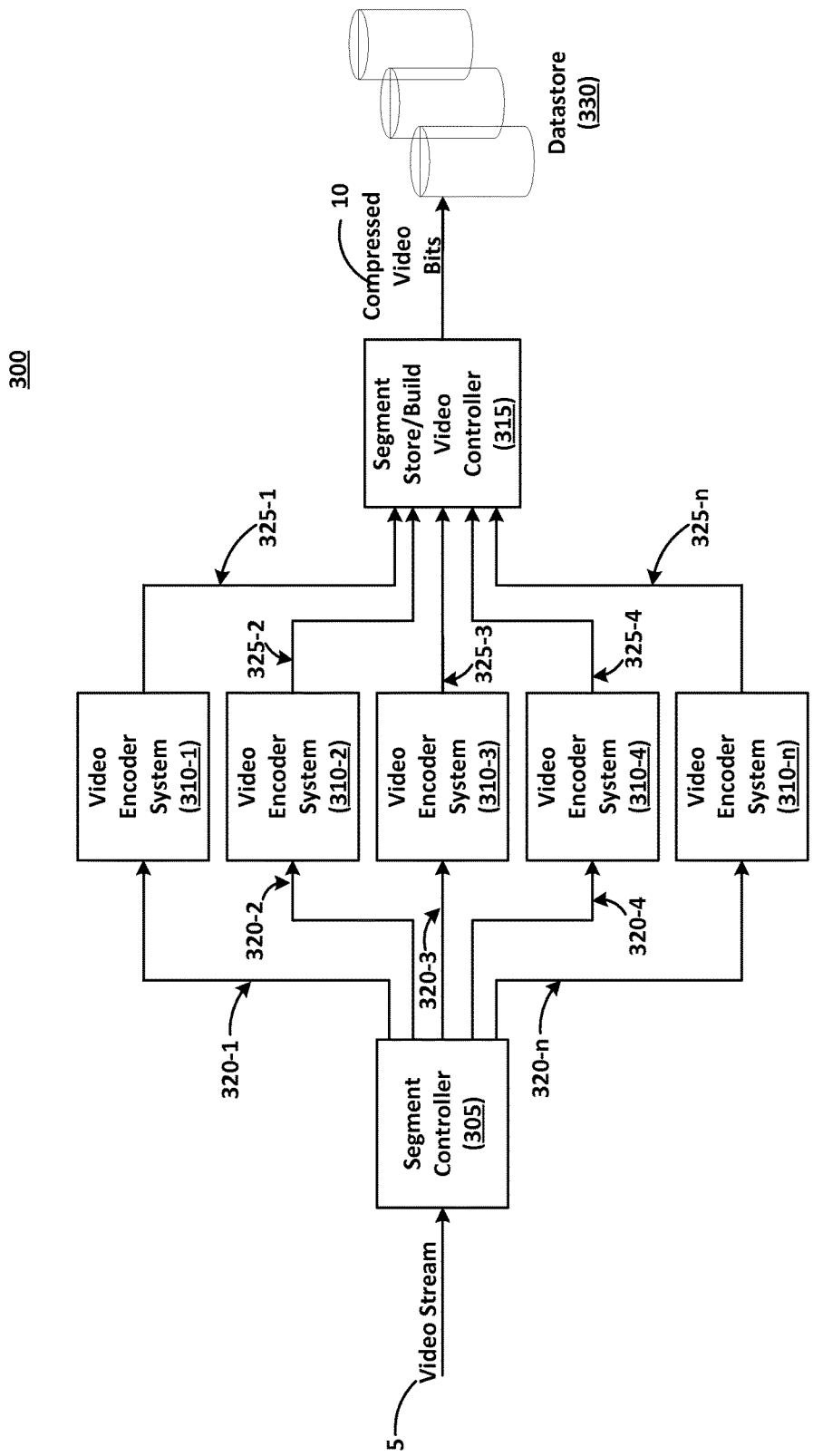
FIG. 3 illustrates a parallel processing video encoder system according to at least one example embodiment.

FIG. 3 illustrates a parallel processing video encoder system according to at least one example embodiment. As shown in FIG. 3, the video encoder system 300 includes a segment controller 305, a plurality of video encoder systems 310-1, 310-2, 310-3, 310-4, 310-n, a segment store/build video controller 315 and a datastore 330. According to example embodiments, a video can be encoded and stored for later streaming. For example, the video may be video stream 5 which can be encoded as compressed video bits 10 which are then stored in datastore 330 for later streaming.

The video stream 5 may be segmented (or broken into smaller length (in time) streams) to each segment to be encoded in parallel by a different encoder. Accordingly, segment controller 305 may be configured to segment the video stream 5 into video stream segments 320-1, 320-2, 320-3, 320-4, 320-*n*. Each of the plurality of video encoder systems 310-1, 310-2, 310-3, 310-4, 310-*n* may be configured to encode a corresponding video stream segment 320-1, 320-2, 320-3, 320-4, 320-*n* as a corresponding compressed video segment 325-1, 325-2, 325-3, 325-4, 325-*n*. The segment controller 305 may be configured to segment the video stream 5 into equal (or approximately equal) length (in time) video stream segments (e.g., video stream segments 320-1, 320-2, 320-3, 320-4, 320-*n*). For example, the video stream segments may be (or may be approximately) 1 second, 5 seconds, 30 seconds, 1 minute, 5 minute and the like segments each (ultra high frame rate video may have smaller (e.g., 1 ms or 5 ms) segments). The video encoder systems 310-1, 310-2, 310-3, 310-4, 310-*n* may further convert the video stream segments into at least one frame to encode.

The segment store/build video controller 315 may be configured to receive the compressed video segments 325-1, 325-2, 325-3, 325-4, 325-*n*, at least one of build a compressed (or encoded) video based on the compressed video segments 325-1, 325-2, 325-3, 325-4, 325-*n* and store the resultant compressed video in the datastore 330 and/or separately store the compressed video segments 325-1, 325-2, 325-3, 325-4, 325-*n* in the datastore 330. For example, the segment store/build video controller 315 may generate a single file that strings the compressed video segment 325-1, 325-2, 325-3, 325-4, 325-*n* in the same order the video stream 5 was segmented from. Accordingly, the segment store/build video controller 315 may receive information related to segment order from the segment controller 305 and use the information related to segment order to build a video as the compressed video bits 10.

Figure 4:
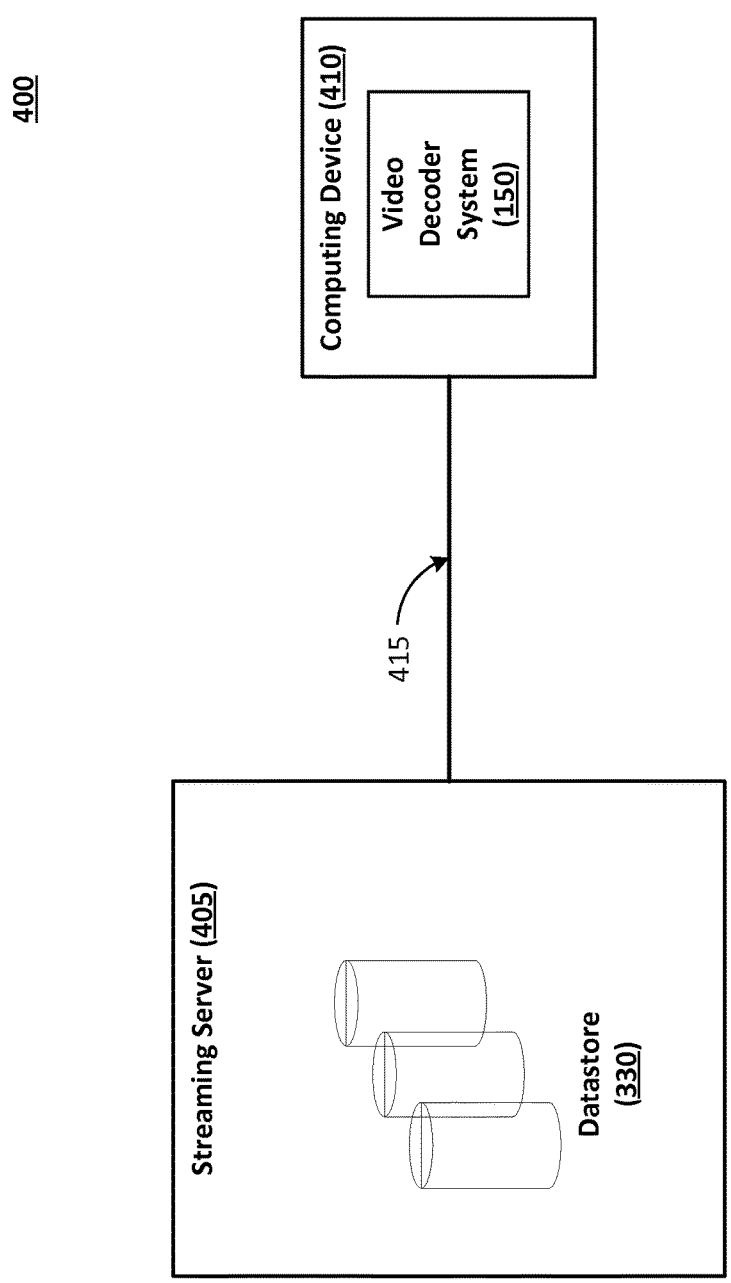
FIG. 4 illustrates a video streaming system according to at least one example embodiment.

FIG. 4 illustrates a video streaming system according to at least one example embodiment. As shown in FIG. 4, the streaming system 400 includes a streaming server 405 and a computing device 410. The streaming server 405 and the computing device 410 are communicatively coupled via link 415. The link 415 may be a wired or wireless link using, for example an internet, intranet, wireless communication standard and the like. The streaming server 405 includes the datastore 330. The datastore 330 may include at least one previously encoded video. The at least one previously encoded video may have been encoded using the video encoder system 300 described above.

The computing device 410 includes the video decoder system 150. The video decoder system 150 may be embodied as a special purpose processor (e.g., a graphics processing unit (GPU) or visual processing unit (VPU). The video decoder system 150 may be embodied as code executed by at least one processor that can be configured to execute computer instructions associated with video decoding. The video decoder system 150 may be configured to receive a streaming video from the datastore 330 as served by the streaming server 405 and communicated via link 415. The streaming server 405 and the computing device 410 may include components (not shown) configured facilitate communications (e.g., transmitters and receivers) between the streaming server 405 and the computing device 410.

Bitrate control (B-CTRL) strategies and quality control (Q-CTRL) strategies can include tradeoffs between bitrate and picture quality. B-CTRL strategies can adjust a quantization parameter (QP) per macroblock based on a prediction of bitrate given QP to achieve a desired bitrate or to remain within some range of min and max bitrates. However, using single pass B-CTRL to achieve a bitrate specified as a number below a maximum may not be successful (e.g., the desired bitrate and or picture quality may not be achieved). The B-CTRL strategies may waste bits for low complexity video segments and may be susceptible to transient under or over-shooting the target bitrate. These transients may be the result of incorrect predictions of bitrate using the bitrate vs. QP prediction models at the start of a segment.

The bitrate mis-assignment at the start can be compensated for by the end of the video segment yielding increased likelihood of mis-predictions at the end of the segment. This can result in decoded frame quality being different at the start of the video segment as compared to the rest of the video segment. This difference in quality may not be an issue in encoding the entire sequence sequentially because only a few frames at the start of the sequence may be affected. However, in parallel processing of video segments the artifacts can appear in every segment causing a "pulsing" of the picture quality.

Q-CTRL strategies can output a constant quality picture, with a variable bitrate output. The variable bitrate output can be specified as an allowable bitrate range. Multi-pass encoding strategies can use a Q-CTRL pass to measure the content activity of the video sequence and as a result gain a better estimate of bitrate/quality tradeoffs. In multi-pass encoding, the Q-CTRL pass can be followed by a B-CTRL to achieve the desired bitrate.

Example embodiments can use a relationship between Constant Rate Factor (CRF) and bitrate. QP (or CRF) and bitrate can be settings associated with an encoder (e.g., encoder 125). For example, QP (or CRF) and bitrate can have associated range settings in which an encoder can operate. In some encoding techniques one or more of QP (or CRF) and bitrate can be held constant resulting in a variable output of the non-set setting. For example, QP (or CRF) can be set to a value resulting in a variable output for bitrate based on the characteristics (e.g., motion) of the input video. Accordingly, in a Q-CTRL encoding strategy or scheme, a value for CRF may be set within the acceptable range (e.g., 0 to 51 where 0 is high quality, or lossless, and 51 is low quality, or high loss) which can result in a variable output bitrate (or file size). In other words, the higher the quality the video (low setting for CRF), the higher the bitrate (or file size) and vice versa.

As stated above, in multi-pass encoding, the Q-CTRL pass can be followed by a B-CTRL to achieve the desired bitrate. In one example implementation, the output of a Q-CTRL pass can be the input of the B-CTRL pass. In another implementation, the Q-CTRL pass can be used to determine a CRF setting to be used in the B-CTRL pass. In the B-CTRL pass, the maximum bitrate or target bitrate can override the CRF. In other words, the output quality of a video may be lower (e.g., slightly lower) than desired in a B-CTRL pass than in a Q-CTRL pass with a same CRF setting for both the B-CTRL pass and the Q-CTRL pass.

According to example implementations, while in a Q-CTRL pass (e.g., implementing a Q-CTRL mode of an encoder) starting from a default CRF value, an estimation of CRF can be iteratively refined through one or more intermediate pass (e.g., one or more intermediate Q-CTRL pass) until a rate distortion cost that is less than a threshold (or maximum constraint) threshold value is achieved. For example, is the bitrate less than (or equal to) a maximum, target or desired bitrate (e.g., Bmax). For example, is PSNR greater than a threshold (e.g., 50 dB), or is a cost function of (Bitrate, Distortion), less than a cost threshold. As an example, is distortion+\lambda*bitrate greater than a cost threshold, where \lambda is the weighting of the rate/distortion trade-offs. A higher \lambda indicates the bitrate is of higher importance and a lower \lambda indicates the distortion is of higher importance. Accordingly, the residual and motion information from that converged encoding pass can represent a better measurement of the video content in the segment. The final pass is then a B-CTRL pass which uses the Q-CTRL information to achieve the output bitrate using a rate control strategy to achieve the desired bitrate.

In example embodiments the encoded bitrates measured from at least one previous pass (e.g., Q-CTRL pass) can be used to predict the CRF that should be used in the next pass (e.g., Q-CTRL pass). Accordingly, an estimation model relating CRF and the encoded bitrate can be developed. The estimation model should be a linear model as follows:

$$\log(B) = \alpha CRF + \beta \quad (1)$$

Where B is the measured bitrate,
$\beta$ is a modeling parameter or constant, and
$\alpha$ is a modeling parameter or constant.

Accordingly, given two measurements of the encoded bitrate at two different CRFs, CRF1 and CRF2, equation (1) can be rewritten as:

$$\log(B_1) - \log(B_2) = \alpha(CRF_1 - CRF_2) \quad (2)$$

Where $B_1$ is the encoded bitrate corresponding to $CRF_1$, and
$B_2$ is the encoded bitrate corresponding to $CRF_2$.

In example implementations, one or more Q-CTRL encoding passes can be performed before the final B-CTRL pass. In this example, the rate distortion cost can be a bitrate, and the cost threshold can be a desired maximum or threshold bitrate (e.g., Bmax). The first Q-CTRL pass can use a default CRF which yields a compressed video with a first bitrate. If the first bitrate is less (or equal to) than a desired maximum or threshold bitrate, the video can be encoded using a B-CTRL strategy with the target bitrate. If the first bitrate is greater than desired maximum or threshold bitrate, a next CRF can be calculated (e.g., estimated or predicted) as:

$$CRF_2 = CRF_1 + \frac{1}{\alpha} \log\left(\frac{B_{max}}{B_1}\right) \quad (3)$$

Where $B_1$ is the target bitrate of the previous pass,
CRF1 is the CRF of the previous pass, and
Bmax is the desired maximum or threshold bitrate.

According to example implementations, a CRF can be estimated or predicted until the measured encoded bitrate approaches Bmax. In other words, the CRF can be estimated or predicted iteratively (e.g., in a second pass, a third pass, and so forth) until the measured encoded bitrate is less than or equal to the desired maximum or threshold bitrate (e.g., Bmax).

According to an example implementation, if the measured bitrate after a Q-CTRL encoding pass is within 10% of Bmax, CRF can be statistically estimated or predicted and the statistically estimated or predicted CRF can be used in a B-CTRL pass. Accordingly, a statistically estimated or predicted CRF based on a prior Q-CTRL encoding pass can be used to encode video in a final pass using a B-CTRL strategy with target bitrate equal to the desired maximum or threshold bitrate (e.g., Bmax).

According to an example implementation, if more than one iteration is necessary to achieve the desired maximum or threshold bitrate (e.g., Bmax), additional iterations of the Q-CTRL encoding pass can be performed with a new estimated or predicted CRF. In other words, if the second Q-CTRL encoding pass results in a measured bitrate greater than the desired maximum or threshold bitrate (e.g., Bmax), another Q-CTRL encoding pass can be performed with a new estimated or predicted CRF. The new estimated or predicted CRF can be calculated (e.g., estimated or predicted) as:

$$CRF_3 = \hat{\alpha} \log(B_{max}) + \hat{\beta} \quad (4)$$

Where, $$\hat{\alpha} = \frac{\log(B_1) - \log(B_2)}{CRF_1 - CRF_2}, \text{ and}$$

$$\hat{\beta} = \log(\beta_1) - \hat{\alpha} CRF_1.$$

In other words, CRF3 is calculated by linear prediction using equation (1) with pairs (CRF1;B1) and (CRF2;B2). Finally, the video is encoded using B-CTRL strategy at target bitrate Bmax using the statistics of the previous Q-CTRL pass.

According to another example implementation, a CRF can be estimated or predicted until a cost function is less than a threshold (or maximum) cost function. For example, the cost function can be written as:

$$Cost = D + \lambda B \quad (5)$$

Where,
D is a measured distortion between the compressed video and the input video,
$\lambda$ is a weighting of rate/distortion trade-offs, and
B is the bitrate of the compressed video.

CRF (or QP) can be incremented or decremented (e.g., increased or decreased) until Cost is less than the cost threshold (or a maximum cost).

Figure 5A:
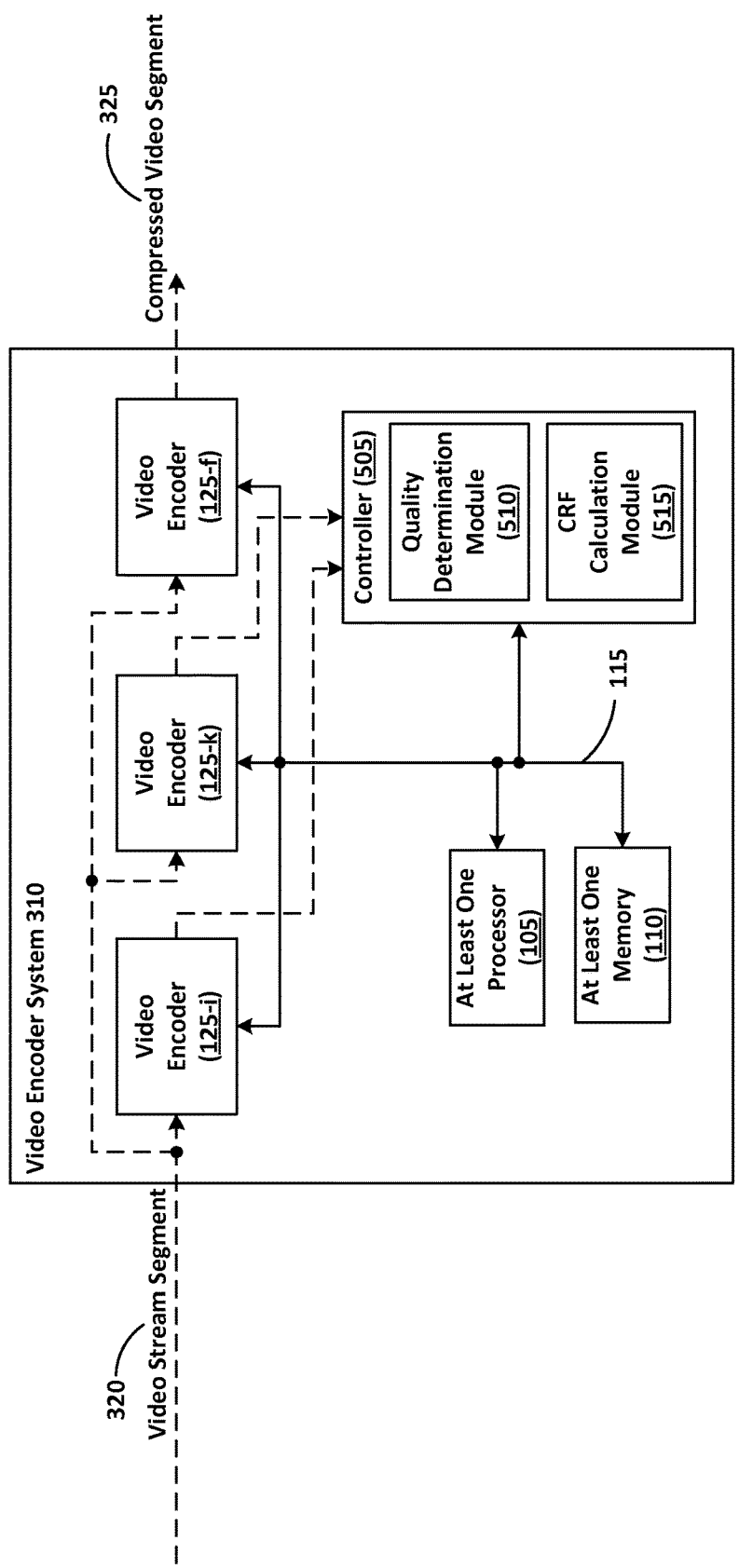
FIGS. 5A and 5B illustrate video encoder systems according to example embodiments.
Figure 5B:
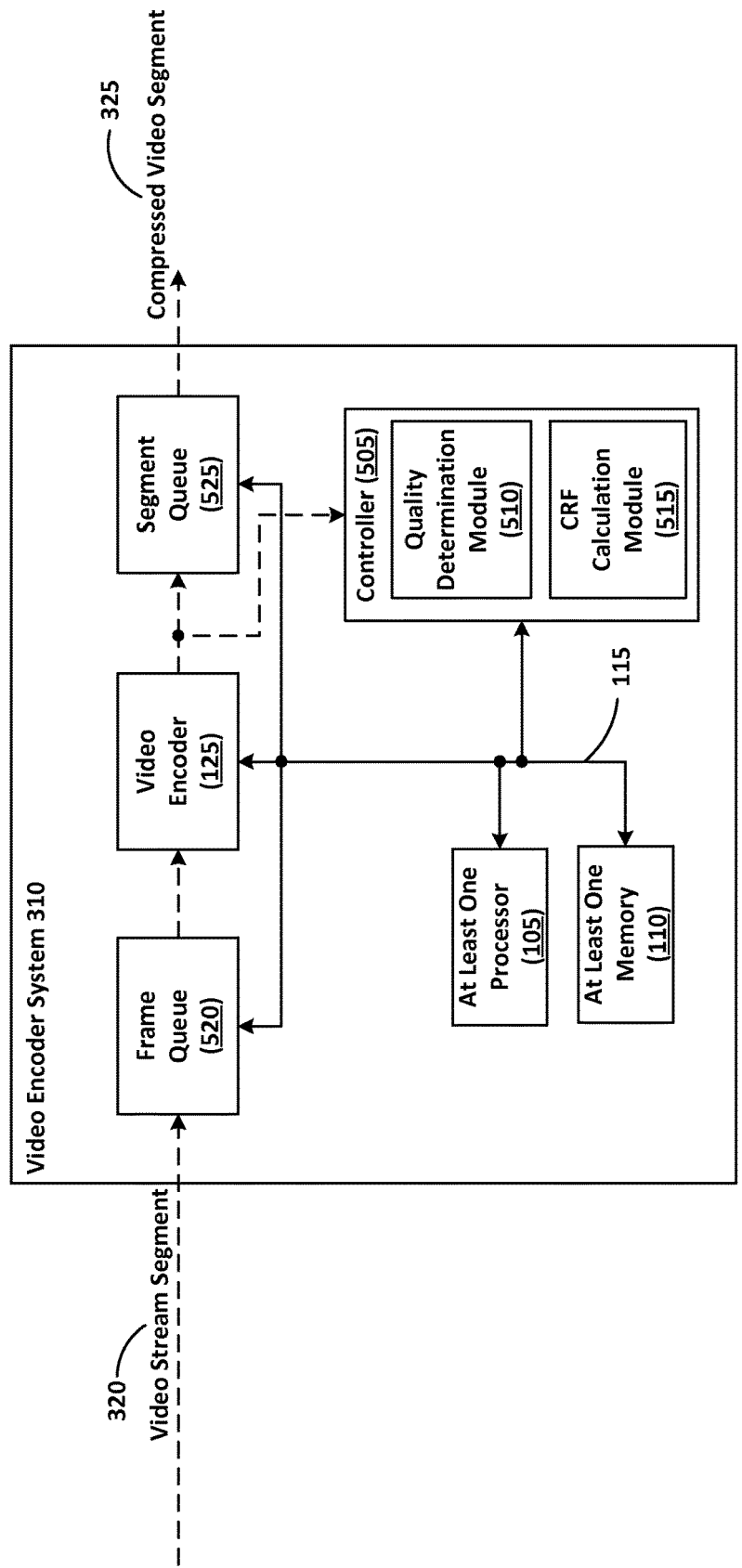

FIGS. 5A and 5B illustrate video encoder systems according to example embodiments. As shown in FIG. 5A, the video encoder system 310 includes video encoder 125-i, video encoder 125-k and video encoder 125-f. Video encoder 125-i, video encoder 125-k and video encoder 125-f each use the video stream segment 320 as input. Video encoder 125-i can be an initial or first encoder in the multi-pass encoding scheme. In other words, video encoder 125-i can be used in a first Q-CTRL pass and can use a default CRF which in-turn yields a compressed video with a first bitrate. The encoded video stream segment (or a signal or other information representing the encoded video stream segment) can be communicated to a controller 505.

The controller 505 includes a quality determination module 510 and a CRF calculation module 515. The quality determination module 510 may be configured to determine a rate-distortion cost (e.g., a measure of quality) for compressed video associated with one or more of the video encoder 125-i, video encoder 125-k and video encoder 125-f. For example, the quality determination module 510 may determine a bitrate, a signal-to-noise ratio (SNR), a peak signal-to-noise ratio (PSNR) (e.g., between the video stream segment 320 and the compressed video) and/or the like for the compressed video as encoded by the video encoder 125-*i*.

The quality determination module 510 may be configured to determine whether the rate distortion cost is less than (or equal to) a threshold value. For example, is the bitrate less than (or equal to) a maximum, target or desired bitrate (e.g., Bmax). For example, is PSNR greater than a threshold (e.g., 50 dB), or is a cost function of (Bitrate, Distortion), less than a cost threshold. As an example, is distortion+ \lambda*bitrate greater than a cost threshold, where \lambda is the weighting of the rate/distortion trade-offs. A higher \lambda indicates the bitrate is of higher importance and a lower \lambda indicates the distortion is of higher importance.

For example, the quality determination module 510 may determine the bitrate for the compressed video as encoded by the video encoder 125-*i*. Upon determining (by the quality determination module 510) the bitrate for the compressed video as encoded by the video encoder 125-*i* is greater than the desired maximum or threshold bitrate (e.g., Bmax), the controller 505 (using the CRF calculation module 515) may calculate (e.g., estimate or predict) a new CRF based on the measured bitrate for the compressed video as encoded by the video encoder 125-*i* and a CRF used by the video encoder 125-*i*. For example, the new CRF may be calculated (e.g., estimated or predicted) using one of equations (1) to (5). For example, the new CRF may be calculated (e.g., estimated or predicted) using equation (3). The controller 505 may communicate the new CRF to the video encoder 125-*k* and instruct the video encoder 125-*k* to encode (as a Q-CTRL pass) the video stream segment 320 using the new CRF.

Video encoder 125-*k* can be an intermediate or second encoder in the multi-pass encoding scheme. In other words, video encoder 125-*k* can be used in a second, subsequent (e.g., after the first pass) or intermediate Q-CTRL pass and can use a calculated (e.g., estimated or predicted) CRF which in-turn yields a compressed video with a second or subsequent bitrate. The video encoder 125-*k* can be used iteratively to perform a Q-CTRL pass until a rate distortion cost is less than (or equal to) a threshold value. For example, the video encoder 125-*k* can be used iteratively to perform a Q-CTRL pass until a measured bitrate approaches (e.g., is less than or equal to) the desired maximum or threshold bitrate (e.g., Bmax). The encoded video stream segment (or a signal or other information representing the encoded video stream segment) can be communicated to a controller 505.

In an example implementation, the quality determination module 510 may determine the bitrate for the compressed video as encoded by the video encoder 125-*k*. Upon determining (by the quality determination module 510) the bitrate for the compressed video as encoded by the video encoder 125-*k* is greater than the desired maximum or threshold bitrate (e.g., Bmax), the controller 505 (using the CRF calculation module 515) may calculate (e.g., estimate or predict) a new CRF based on the measured bitrate for the compressed video as encoded by the video encoder 125-*k* and a CRF used by the video encoder 125-*k*. For example, the new CRF may be calculated (e.g., estimated or predicted) using one of equations (1) to (5). For example, the new CRF may be calculated (e.g., estimated or predicted) using equation (4). The controller 505 may communicate the new CRF to the video encoder 125-*k* and instruct the video encoder 125-*k* to encode (as a Q-CTRL pass) the video stream segment 320 using the new CRF.

Upon determining (by the quality determination module 510) the bitrate for the compressed video as encoded by the video encoder 125-*k* is less than (or equal to, or approximately equal to) the desired maximum or threshold bitrate (e.g., Bmax), the controller 505 can communicate the last calculated CRF to the video encoder 125-*f* and instruct the video encoder 125-*f* to encode (as a B-CTRL pass) the video stream segment 320 using the last calculated CRF. Accordingly, the video encoder 125-*f* can be a final or last encoder in the multi-pass encoding scheme. Therefore, the video encoder 125-*f* can be configured to output the compressed video segment 325 at the desired bitrate and at a quality that should be consistent across a plurality of video encoder systems (e.g., the plurality of video encoder systems 310-1, 310-2, 310-3, 310-4, 310-*n*). As a result, compressed video segments 325-1, 325-2, 325-3, 325-4, 325-*n* should be of a consistent quality.

FIG. 5B illustrates an alternative embodiment of the video encoder system 310. As shown in FIG. 5B, encoder 310 includes the video encoder 125 as well as frame queue 520 and segment queue 525. Frame queue 520 may be configured to store frames of the video stream segment 320. Segment queue 525 may be configured to store compressed or encoded frames associated with the video stream segment 320. The video encoder 125 may be configured to iteratively encode the video stream segment 320 (or frames thereof) using one or more Q-CTRL passes and configured to generate compressed or encoded frames associated with the video stream segment 320 using a B-CTRL pass. Controller 505 may be configured to provide instructions to the video encoder 125 that cause the video encoder 125 to use a Q-CTRL scheme or a B-CTRL scheme to encode the video stream segment 320 (or frames thereof).

In an example implementation, the video encoder 125 receives a video stream segment 320 (or frames thereof) from the frame queue 520. In addition, the controller 505 instructs the video encoder 125 to encode the video stream segment 320 (or frames thereof). Upon determining the encoding iteration is a first iteration, the controller instructs or causes the video encoder 125 to encode the video stream segment 320 (or frames thereof) using a Q-CTRL scheme with a default CRF which in-turn yields a compressed video with a first bitrate. The encoded video stream segment (or a signal or other information representing the encoded video stream segment) can be communicated to the controller 505.

The quality determination module 510 may be configured to determine whether a rate-distortion cost (e.g., a measure of quality) is less than (or equal to) a threshold value. For example, is the bitrate less than (or equal to) a maximum, target or desired bitrate (e.g., Bmax). For example, the quality determination module 510 may be configured to determine a bitrate for compressed video associated with the video encoder 125. Upon determining (by the quality determination module 510) the bitrate for the compressed video as encoded by the video encoder 125 is greater than the desired maximum or threshold bitrate (e.g., Bmax), the controller 505 (using the CRF calculation module 515) may calculate (e.g., estimate or predict) a new CRF based on the measured bitrate for the compressed video as encoded by the video encoder 125 and a CRF used by the video encoder 125. For example, the new CRF may be calculated (e.g., estimated or predicted) using one of equations (1) to (5). For example, the new CRF may be calculated (e.g., estimated or predicted) using equations (3) and (5) in a second Q-CTRL pass and equations (4) and (5) in a third or after Q-CTRL pass. The controller 505 may communicate the new CRF to the video encoder 125 and instruct the video encoder 125 to encode the video stream segment 320 using a Q-CTRL scheme with a default CRF which in-turn yields a compressed video with a bitrate different (e.g., lower) than the first bitrate.

Upon determining (by the quality determination module 510) the bitrate for the compressed video as encoded by the video encoder 125 is less than (or equal to, or approximately equal to) the desired maximum or threshold bitrate (e.g., Bmax), the controller 505 can communicate the last calculated CRF to the video encoder 125 and instruct the video encoder 125 to encode using a B-CTRL scheme with the last calculated CRF which in-turn yields a compressed video with a desired final bitrate. Accordingly, the video encoder 125 can be configured to output the compressed video segment 325 at the desired bitrate and at a quality that should be consistent across a plurality of video encoder systems (e.g., the plurality of video encoder systems 310-1, 310-2, 310-3, 310-4, 310-*n*). As a result, compressed video segments 325-1, 325-2, 325-3, 325-4, 325-*n* should be of a consistent quality.

Figure 6:
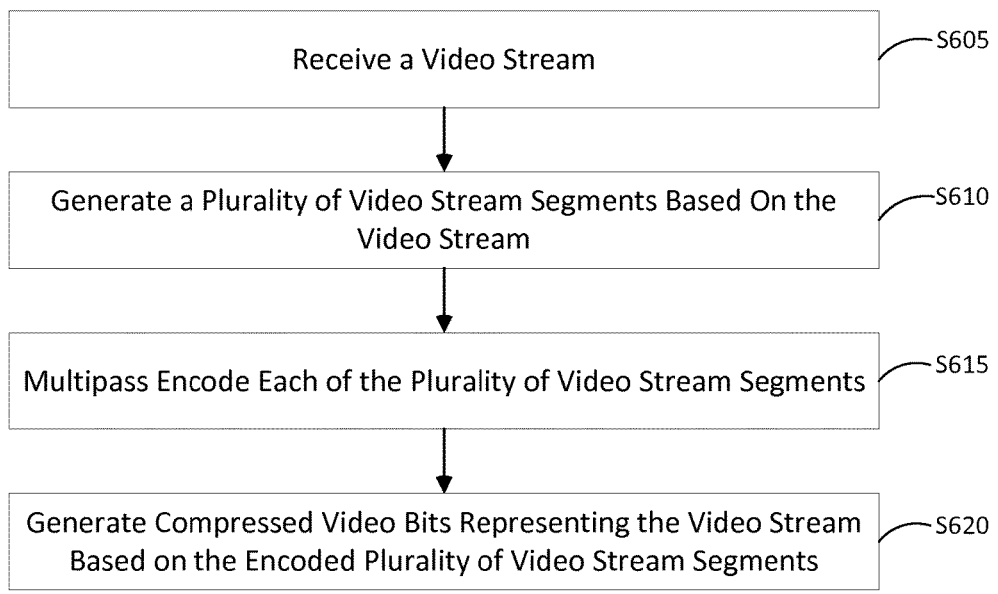
FIGS. 6 and 7 illustrate methods for encoding streaming video according to at least one example embodiment.
Figure 7:
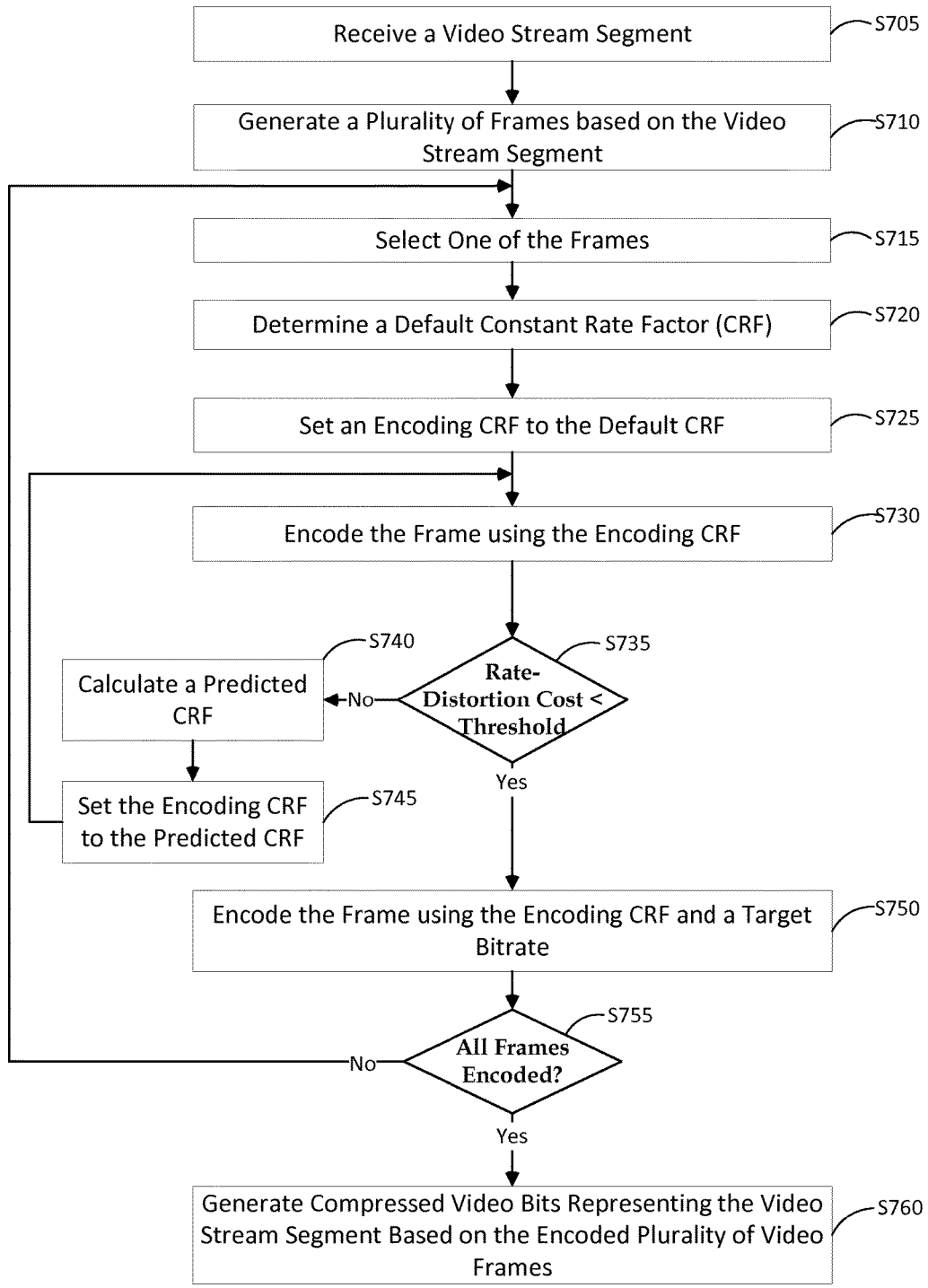

FIGS. 6 and 7 are flowcharts of methods according to example embodiments. The steps described with regard to FIGS. 6 and 7 may be performed due to the execution of software code stored in a memory (e.g., at least one memory 110) associated with an apparatus (e.g., as shown in FIGS. 1A, 2A, 5A and/or 5B) and executed by at least one processor (e.g., at least one processor 105) associated with the apparatus. In an example implementation, a non-transitory computer-readable storage medium can have computer executable program code stored thereon. The computer executable program code can causes a computer system to perform steps associated the methods described with regard to FIGS. 6 and 7. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 6 and 7.

FIG. 6 illustrates a method for encoding streaming video according to at least one example embodiment. As shown in FIG. 6, in step S605 a video stream is received. For example, video encoder system 300 may receive video stream 5. In an example implementation, segment controller 305 may be configured to receive the video stream 5 as part of an initialization of an encoding process. The video source(s) the may include any video source (e.g., a data storage device, a network, the Internet, a separate computing device, and the like). For example, the video sequence frame(s) may be video frames associated with a video stream (e.g., video stream 5, video stream segment 320). The video stream may be a real time video stream (e.g., a video conference or a video chat). For example, the video stream may be a previously recorded video (e.g., a movie or a video recorder recording). In addition, the video content may be analog or digital video.

In step S610 a plurality of video stream segments is generated based on the video stream. For example, segment controller 305 may be configured to segment the video stream 5 into video stream segments 320-1, 320-2, 320-3, 320-4, 320-*n*. Each of the plurality of video encoder systems 310-1, 310-2, 310-3, 310-4, 310-*n* may be configured to encode a corresponding video stream segment 320-1, 320-2, 320-3, 320-4, 320-*n* as a corresponding compressed video segment 325-1, 325-2, 325-3, 325-4, 325-*n*. The segment controller 305 may be configured to segment the video stream 5 into equal (or approximately equal) length (in time) video stream segments (e.g., video stream segments 320-1, 320-2, 320-3, 320-4, 320-*n*). For example, the video stream segments may be (or may be approximately) 1 second, 5 seconds, 30 seconds, 1 minute, 5 minute and the like segments each (ultra high frame rate video may have smaller (e.g., 1 ms or 5 ms) segments). The video encoder systems 310-1, 310-2, 310-3, 310-4, 310-*n* may further convert the video stream segments into at least one frame to encode.

In step S615 each of the plurality of video stream segments is multi-pass encoded. For example, each of the plurality of video stream segments may be transformed (encoded or compressed) into transform coefficients using a configured transform (e.g., a KLT, a SVD, a DCT or an ADST). The encoded transform coefficients or set of residual values for the block can be quantized. For example, the controller 120, 505 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. Further, encoding the frame including the 2D representation may include decomposing the frame into N×N blocks or macroblocks. For example, the controller 120 may instruct the encoder to decompose each of the video sequence frames into macroblocks having N×N dimensions. For example, the encoder can use a quadtree decomposition technique to decompose the frames including the 2D representation. In an example implementation, the each of the plurality of video stream segments may be multi-pass encoded in that each of the plurality of video stream segments may be Q-CTRL encoded one or more times and finally B-CTRL encoded. Multi-pass encoding is described in more detail above. Each of the plurality of video stream segments may be encoded in parallel (e.g., by different encoders at approximately the same time).

In step S620 generate compressed video bits representing the video stream based on the encoded plurality of video stream segments. For example, in one example embodiment, the parallel output of the multi-pass encoders may be stored as a plurality of compressed video segments. In another example implementation, the parallel output of the multi-pass encoders may be put together to form a complete video representing the video stream. The complete video representing the video stream may then be stored.

FIG. 7 illustrates another method for encoding streaming video according to at least one example embodiment. As shown in FIG. 7, in step S705 a video stream segment is received. For example, segment controller 305 may be configured to segment the video stream 5 into video stream segments 320-1, 320-2, 320-3, 320-4, 320-*n*. An encoder (e.g., video encoder systems 310-1, 310-2, 310-3, 310-4, 310-*n*) may include a controller (e.g., controller 120, 505) that can include instructions that cause the encoder (or instruct the encoder, or control the encoder) to receive one of the video stream segments 320-1, 320-2, 320-3, 320-4, 320-*n*.

In step S710 a plurality of frames are generated based on the video stream segment. For example, the video encoder 125, 310 may convert the video stream segment (e.g., video stream segments 320-1, 320-2, 320-3, 320-4, 320-*n*) into discrete video frames. The video encoder 125, 310 may further convert each discrete video frame (or image) into a matrix of blocks (hereinafter referred to as blocks). For example, a video frame (or image) may be converted to a 16×16, a 16×8, an 8×8, a 4×4, a 2×2 and/or the like matrix of blocks each having a number of pixels. Although five example matrices are listed, example embodiments are not limited thereto.

In step S715 one of the frames is selected. For example, the controller 505 may select one of the plurality of frames of the video stream segment to be encoded by the encoder (e.g., video encoder systems 310-1, 310-2, 310-3, 310-4, 310-n). In step S720 a default constant rate factor (CRF) is determined. For example, the controller may have stored in an associated memory at least one default CRF for a maximum, target or desired bitrate. Accordingly, the default CRF may be determined by selecting or reading the default CRF from the memory based on the maximum (e.g., Bmax), target or desired bitrate.

In step S725 an encoding CRF is set to the default CRF. For example, the current encoding pass in the multi-pass encoding scheme may be the first Q-CTRL pass. Accordingly, a variable for the CRF may be set to the (determined) default CRF.

In step S730 encode the frame using the encoding CRF. For example, the video encoder (e.g., video encoder 125, 125-i) can be an initial or first encoder in the multi-pass encoding scheme. In other words, the video encoder can be used in a first Q-CTRL pass and can use a default CRF which in-turn yields a compressed video with a bitrate (e.g., a first bitrate). The encoded video stream segment (or a signal or other information representing the encoded video stream segment) can be communicated to a controller (e.g., controller 505) where in step S735 the controller determines whether a rate distortion cost is less than (or equal to) a threshold value. For example, is the bitrate less than (or equal to) a maximum, target or desired bitrate (e.g., Bmax). For example, is PSNR greater than a threshold (e.g., 50 dB), or is a cost function of (Bitrate, Distortion), less than a cost threshold. As an example, is distortion+\lambda*bitrate greater than a cost threshold, where \lambda is the weighting of the rate/distortion trade-offs. A higher \lambda indicates the bitrate is of higher importance and a lower \lambda indicates the distortion is of higher importance.

If the quality is less than (or equal to) a threshold value, control continues to step S750. Otherwise, processing continues to step S740 where a predicted CRF is calculated. For example, the CRF may be calculated (e.g., estimated or predicted) using one of equations (1) to (5). For example, the CRF may be calculated (e.g., estimated or predicted) using equations (3) or (5) in a second Q-CTRL pass or equations (4) or (5) in a third or greater Q-CTRL pass. In an example implementation, the controller (e.g., controller 505) can calculate the CRF and may communicate the CRF to the video encoder (e.g., video encoder 125, 125-k) and instruct the video encoder to encode (as a Q-CTRL pass) the video stream segment using the CRF. Accordingly, in step S745 the Encoding CRF is set to the Predicted CRF and control returns to step S730.

In step S750 encode the frame using the encoding CRF and a target bitrate. For example, upon determining (e.g., by the quality determination module 510) the bitrate for the compressed video is less than (or equal to, or approximately equal to) the desired maximum or threshold bitrate (e.g., Bmax), the controller (e.g., controller 505) can communicate the encoding CRF (e.g., as the last calculated CRF) to the video encoder (e.g., encoder 125, 125-f) and control (or instruct) the video encoder to encode (as a B-CTRL pass) the compressed (or encoded frame) using the encoding CRF in a B-CTRL encoding scheme. Accordingly, the video encoder can be a final or last encoder (or last pass of an encoder) in the multi-pass encoding scheme. Therefore, the video encoder can be configured to output the compressed frame of the video segment at the desired bitrate and at a quality that should be consistent across a plurality of video encoder systems (e.g., the plurality of video encoder systems 310-1, 310-2, 310-3, 310-4, 310-n).

In step S755 a determination is made as to whether all frames encoded. For example, the controller (e.g., controller 505) can determine if the current frame is the last frame in the video segment. If all frames encoded processing continues to step S770. Otherwise, processing returns to step S715. In step S760 compressed video bits representing the video stream segment are generated based on the encoded plurality of video frames. For example, the compressed or encoded frames are reconfigured as a sequence of frames or a compressed video stream (or stream segment) representing the video segment. The video segment can be compressed or encoded at the desired bitrate and at a quality that should be consistent across a plurality of video encoder systems (e.g., the plurality of video encoder systems 310-1, 310-2, 310-3, 310-4, 310-n). As a result, compressed video segments 325-1, 325-2, 325-3, 325-4, 325-n should be of a consistent quality.

As will be appreciated, the system 100 and 150 illustrated in FIGS. 1A and 1B and/or encoder/decoder 300, 310 and 400 illustrated in FIGS. 3, 4, 5A and 5B may be implemented as an element of and/or an extension of the generic computer device 800 and/or the generic mobile computer device 850 described below with regard to FIG. 8. Alternatively, or in addition to, the system 100 and 150 illustrated in FIGS. 1A and 1B and/or encoder/decoder 300, 310 and 400 illustrated in FIGS. 3, 4, 5A and 5B may be implemented in a separate system from the generic computer device 800 and/or the generic mobile computer device 850 having some or all of the features described below with regard to the generic computer device 800 and/or the generic mobile computer device 850.

Figure 8:
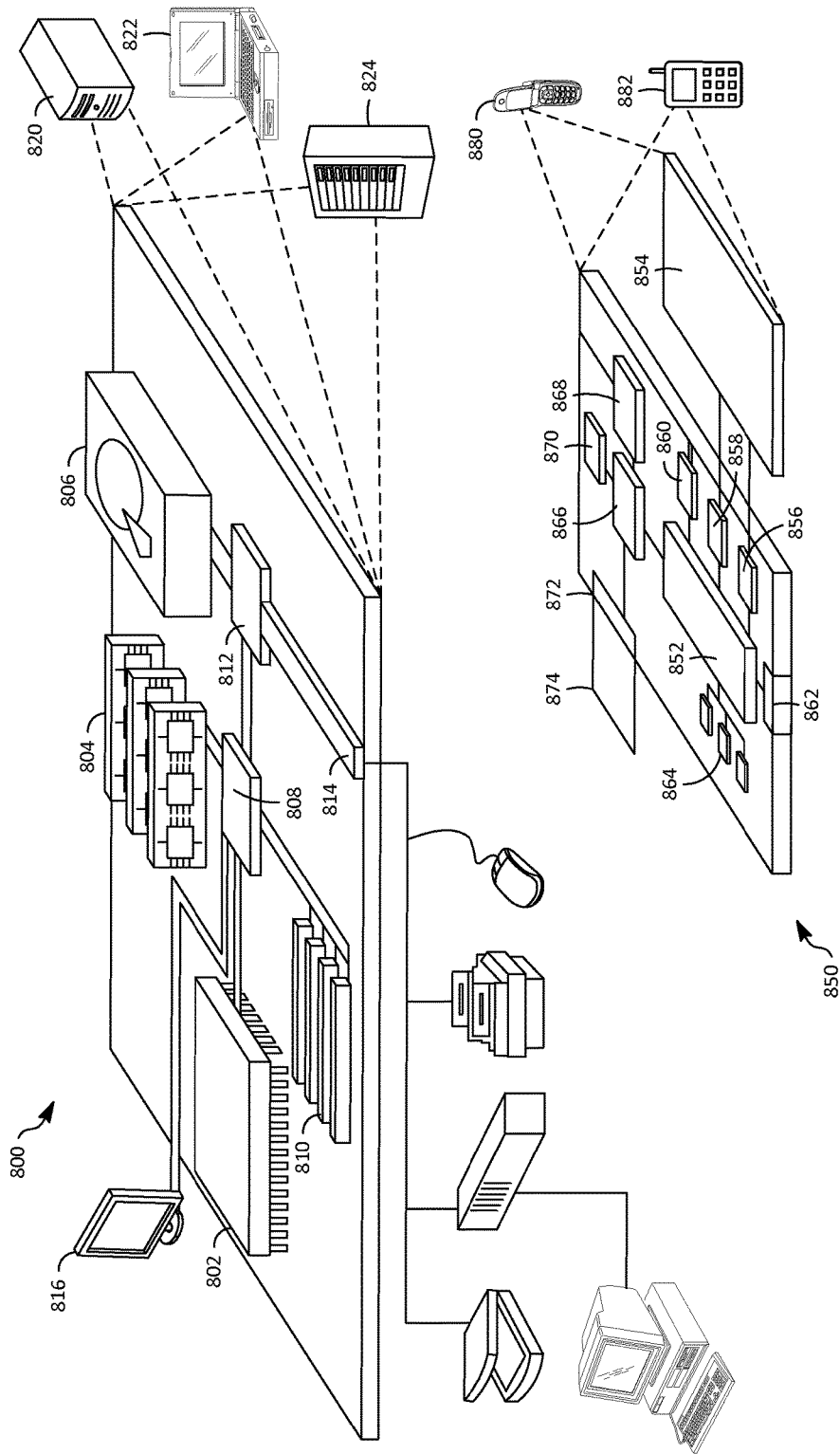
FIG. 8 is a schematic block diagram of a computer device and a mobile computer device that can be used to implement the techniques described herein.

FIG. 8 is a schematic block diagram of a computer device and a mobile computer device that can be used to implement the techniques described herein. FIG. 8 is an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing partitions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory computer storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
   determining whether a rate distortion cost of a compressed video is above a cost threshold, the compressed video being encoded using a first constant rate factor (CRF);
   upon determining a quality of the compressed video is above the cost threshold,
      calculating a second CRF as:

$$CRF_2 = CRF_1 = \frac{1}{\alpha}\log\left(\frac{B_{max}}{B_1}\right)$$

where $CRF_1$ is the first CRF,
      $CRF$, is the second CRF,
      $\alpha$ is a constant,
      Bmax is the target maximum bitrate, and
      $B_1$ is the bitrate of the compressed video, and
      encoding a video associated with the compressed video using the second CRF; or
   upon determining a quality of the compressed video is below the cost threshold,
      encoding a video associated with the compressed video using the first CRF and a target bitrate.

2. The method of claim 1, further comprising:
   after encoding of the video associated with the compressed video using the second CRF, determining whether a quality associated with encoding the video associated with the compressed video using the second CRF is above the cost threshold;
   upon determining the quality associated with encoding the video associated with the compressed video using the second CRF is above the cost threshold,
      calculating a third CRF based on the first CRF and the second CRF, and
      encoding the video associated with the compressed video using the third CRF; or
   upon determining the quality associated with encoding the video associated with the compressed video using the second CRF is below the cost threshold,
   encoding the video associated with the compressed video using the second CRF and the target bitrate.

3. The method of claim 1, wherein the first CRF is a default CRF.

4. The method of claim 1, wherein
   the rate distortion cost is a measured bitrate, and
   the cost threshold is the target maximum bitrate.

5. The method of claim 1, wherein
   the determining of whether the quality of the compressed video is above the cost threshold includes determining whether a bitrate of the compressed video is ten percent above the target maximum bitrate, and
   upon determining the bitrate of the compressed video is ten percent above the target maximum bitrate, encoding of the video associated with the compressed video using the first CRF and the target bitrate includes adjusting the first CRF based on a statistically estimated CRF.

6. The method of claim 1, wherein the second CRF is based on:

$$Cost = D + \lambda B$$

Where,
      D is a measured distortion between the compressed video and an input video,
      $\lambda$ is a weighting of rate/distortion trade-offs, and
      B is the bitrate of the compressed video.

7. The method of claim 1, wherein the compressed video is encoded in a Q-CTRL pass of a multi-pass encoding scheme.

8. The method of claim 1, wherein the encoding of the video associated with the compressed video using the first CRF and the target bitrate is encoding the video in a B-CTRL pass of a multi-pass encoding scheme.

9. A method, comprising:
   in a first pass of a multi-pass encoding scheme, encoding a video stream using a first constant rate factor (CRF) to generate a compressed video stream;
   determining a rate distortion cost associated with the compressed video stream;
   determining whether the rate distortion cost is above a cost threshold;
   upon determining the rate distortion cost is above the cost threshold,
      calculating a second CRF as:

$$CRF_2 = CRF_1 + \frac{1}{\alpha}\log\left(\frac{B_{max}}{B_1}\right)$$

where $CRF_1$ is the first CRF,
      CRF is the second CRF,
      $\alpha$ is a constant,
      Bmax is the target maximum bitrate, and
      $B_1$ is the bitrate of the compressed video, and
      in an intermediate pass of the multi-pass encoding scheme, encoding the video stream associated with the compressed video stream using the second CRF; or
   upon determining the rate distortion cost is below the cost threshold,
      in a final pass of the multi-pass encoding scheme, encoding the video stream associated with the compressed video stream using the first CRF and a target bitrate.

10. The method of claim 9, further comprising:
   after encoding of the video stream associated with the compressed video stream using the second CRF, determining whether a quality associated with encoding the video stream associated with the compressed video stream using the second CRF is above the cost threshold;
   upon determining the quality associated with encoding the video stream associated with the compressed video stream using the second CRF is above the cost threshold,
      calculating a third CRF based on the first CRF and the second CRF, and
      encoding the video stream associated with the compressed video stream using the third CRF; or upon determining the quality associated with encoding the video stream associated with the compressed video stream using the second CRF is below the cost threshold,
  encoding a video stream associated with the compressed video stream using the second CRF and the target bitrate.

11. The method of claim 9, wherein
the rate distortion cost is a measured bitrate, and
the cost threshold is a target maximum bitrate.

12. The method of claim 9, wherein
the determining of whether the quality of the compressed video stream is above the cost threshold includes determining whether a bitrate of the compressed video stream is ten percent above a target maximum bitrate, and
upon determining the bitrate of the compressed video stream is ten percent above the target maximum bitrate, encoding of the video stream associated with the compressed video stream using the first CRF and the target bitrate includes adjusting the first CRF based on a statistically estimated CRF.

13. The method of claim 9, wherein the second CRF is based on:

$$Cost = D + \lambda B$$

Where,
  D is a measured distortion between the compressed video stream and an input video,
  λ is a weighting of rate/distortion trade-offs, and
  B is the bitrate of the compressed video.

14. A non-transitory computer-readable storage medium having stored thereon computer executable program code which, when executed on a computer system, causes the computer system to perform steps comprising:
  determining whether a quality of a compressed video is above a cost threshold, the compressed video being encoded using a first constant rate factor (CRF);
  upon determining the quality of the compressed video is above a cost threshold,
    calculating a second CRF based on the first CRF as:

$$CRF_3 = \hat{\alpha} \log(B_{max}) + \hat{\beta}$$

where $$\hat{\alpha} = \frac{\log(B_1) - \log(B_2)}{CRF_1 - CRF_2},$$

and $$\hat{\beta} = \log(B_1) - \hat{\alpha} CRF_1$$

$CRF_1$ is a CRF used to encode the video before using the first CRF,
  $CRF_2$ is the first CRF,
  α is a constant,
  Bmax is the target maximum bitrate,
  $B_1$ is a bitrate associated with $CRF_1$
  $B_2$ is the bitrate of the compressed video, and
    encoding a video associated with the compressed video using the second CRF; or
  upon determining the quality of the compressed video is below a cost threshold,
    encoding a video associated with the compressed video using the first CRF and a target bitrate.

15. A method, comprising:
  in a first pass of a multi-pass encoding scheme, encoding a video stream using a first constant rate factor (CRF) to generate a first compressed video stream;
  determining a rate distortion cost associated with the first compressed video stream;
  determining whether the rate distortion cost is above a cost threshold;
  upon determining the rate distortion cost is above the cost threshold,
    calculating a second CRF as:

$$CRF_3 = \hat{\alpha} \log(B_{max}) + \hat{\beta}$$

where, $$\hat{\alpha} = \frac{\log(B_1) - \log(B_2)}{CRF_1 - CRF_2},$$

and $$\hat{\beta} = \log(B_1) - \hat{\alpha} CRF_1$$

$CRF_1$ is a CRF used to encode the video before using the first CRF,
  $CRF_2$ is the first CRF,
  α is a constant,
  Bmax is the target maximum bitrate,
  $B_1$ is a bitrate associated with $CRF_1$
  $B_2$ is the bitrate of the compressed video, and
    in an intermediate pass of the multi-pass encoding scheme, encoding the video stream using the second CRF; or
  upon determining the rate distortion cost is below the cost threshold,
    in a final pass of the multi-pass encoding scheme, encoding the video using the first CRF and a target bitrate.

* * * * *

UNITED STATES PATENT AND TRADEMARK OFFICE
CERTIFICATE OF CORRECTION

PATENT NO. : 10,313,675 B1
APPLICATION NO. : 14/611084
DATED : June 4, 2019
INVENTOR(S) : Lin et al.

It is certified that error appears in the above-identified patent and that said Letters Patent is hereby corrected as shown below:

In the Claims

Column 23, Claim 1, Line 25, delete "$CRF_2 = CRF_1 = \frac{1}{\alpha}\log\left(\frac{B_{max}}{B_1}\right)$" and insert -- $CRF_2 = CRF_1 + \frac{1}{\alpha}\log\left(\frac{B_{max}}{B_1}\right)$ --, therefor.

Column 23, Claim 1, Line 28, delete "CRF," and insert -- $CRF_2$ --, therefor.

Column 24, Claim 9, Line 39, delete "CRF" and insert -- $CRF_2$ --, therefor.

Signed and Sealed this
Tenth Day of December, 2019

Andrei Iancu
*Director of the United States Patent and Trademark Office*